United States Patent
Odaohhara (10) Patent No.: US 6,895,516 B2
(45) Date of Patent: May 17, 2005

(54) SWITCHING BETWEEN SOURCE POWER SUPPLY AND BATTERY OF A SYSTEM BASED UPON CONNECTION STATUS OF SOURCE POWER SUPPLY AND BATTERY AND A SYSTEM PARAMETER INDICATIVE OF THE STATUS OF THE SYSTEM

(75) Inventor: Shigefumi Odaohhara, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 09/923,135

(22) Filed: Aug. 6, 2001

(65) Prior Publication Data

US 2002/0023235 A1 Feb. 21, 2002

(30) Foreign Application Priority Data

Aug. 16, 2000 (JP) .................................... 2000-247049

(51) Int. Cl.[7] .............................................. G06F 1/26
(52) U.S. Cl. ...................... 713/300; 713/320; 713/340
(58) Field of Search ............................ 713/1, 300, 320, 713/340

(56) References Cited

U.S. PATENT DOCUMENTS

| | | | | |
|---|---|---|---|---|
| 5,239,495 A | * | 8/1993 | Nanno et al. | 713/321 |
| 5,819,069 A | * | 10/1998 | Wong et al. | 379/67.1 |
| 5,944,828 A | * | 8/1999 | Matsuoka | 713/323 |

FOREIGN PATENT DOCUMENTS

| | | | | |
|---|---|---|---|---|
| JP | 11-187665 | | 7/1999 | |
| JP | 2000112579 A | * | 4/2000 | G06F/1/26 |

* cited by examiner

Primary Examiner—Dennis M. Butler
Assistant Examiner—Suresh Suryawanshi
(74) Attorney, Agent, or Firm—Carlos Munoz-Bustamante (57) ABSTRACT

An electric supply system and device therefor including an AC adapter for supplying electric power received from external thereto; a battery being charged with electric power supplied from this AC adapter and enabled to supply electric power to the system by discharging the charged electric power; and a controller for controlling the supply of the electric power to the system from the AC adapter and the battery. The controller stops the supply of the electric power to the system from the AC adapter so as to supply the electric power to the system from the battery while the AC adapter connected to the system is powered off or loaded lightly.

15 Claims, 6 Drawing Sheets

SWITCHING BETWEEN SOURCE POWER SUPPLY AND BATTERY OF A SYSTEM BASED UPON CONNECTION STATUS OF SOURCE POWER SUPPLY AND BATTERY AND A SYSTEM PARAMETER INDICATIVE OF THE STATUS OF THE SYSTEM

BACKGROUND OF THE INVENTION

The present invention relates to an electric power supply apparatus, etc., more particularly to an apparatus and a method for reducing the loss of electric power supplied to a notebook PC, etc.

At present, in such an electric device as an information terminal represented by a notebook PC, which is provided with an AC adapter and a battery, occurs a power conversion loss in the AC adapter when the device is powered off (almost no loaded) or suspended (slightly loaded). At this time, the electric power is consumed not only in the AC adapter, but also in the internal circuits of the device.

Figure 6:
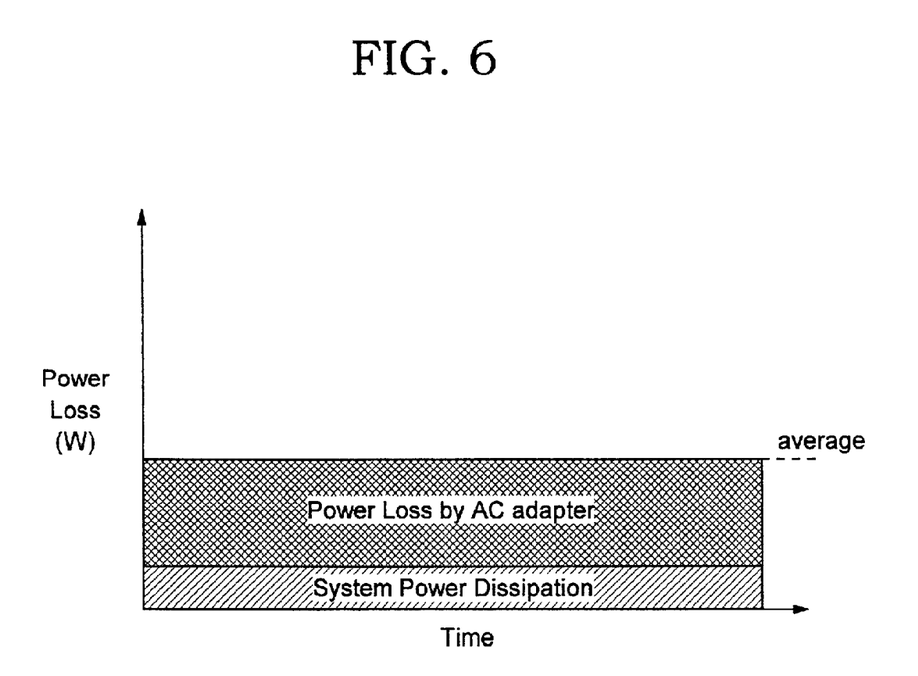
FIG. 6 shows system power dissipation when the conventional AC adapter is used and the electric device is powered off or loaded lightly.

FIG. 6 shows how such electric power is consumed in a conventional AC adapter used for the electric device when the device is powered off. In particular, it is supposed here that the AC adapter is connected to a notebook PC or the like and the PC is prevented from being powered. In FIG. 6, the horizontal axis denotes a time and the vertical axis denotes electric power consumption. In this case, the total power loss means a total of the system power dissipation by the internal circuits of the subject electric device (a notebook PC or the like) and the power loss by the AC adapter. Because the controller, etc. must always be kept active in the inner circuits of the device, for example, so as to charge a battery even when the device is powered off, the device comes to consume electric power up to a certain value.

For example, for a computer, which is an example of an electric device in this specification, electric power is kept to be supplied to the timer, the keyboard/mouse controller, etc. so as to perform predetermined functions for activating the timer, etc. even when the device is powered off. (A component kept to be supplied with electric power in such a way even when the device is powered off is referred to as a power-off-time active component in this specification.) On the other hand, when the device is powered off, the electric powers to other components including the main CPU are shut off, so unnecessary power consumption is prevented. (A component to which the electric power supply is shut off in such a way when the device is powered off is referred to as a power-off-time inactive component".)

To supply electric power to such a power-off-time active component when the subject electric device is powered off and shut off the electric power to such a power-off-time inactive component, there is a method proposed. According to the method, a DC/DC converter is used to supply electric power to a power-off-time inactive component and the output voltage from the DC/DC converter is shut off so as to achieve the above purpose. If the DC/DC converter is used to relay supply of electric power to both of a power-off-time inactive component and a power-off-time active component, an FET (field effect transistor) is powered off. The FET relays the output voltage of the DC/DC converter to the power-off-time inactive component; the output voltage of the DC/DC converter is not shut off at this time. The conventional method has been employed for such an object.

On the other hand, especially for a notebook PC or the like, if the PC is not accessed for a certain time the PC is suspended (loaded lightly) to prevent battery consumption, thereby shutting off the supply of the electric power to other components (the main CPU, the CRT, etc.) except for some components (the main memory, the keyboard/mouse controller, the VRAM, etc.), which are required to resume the PC from the suspended state. In this specification, a component supplied with electric power when the PC is loaded lightly is referred to as "a light-load-time active component" and a component to which supply of electric power is shut off when the PC is loaded lightly is referred to as "a light-load-time inactive component".

The power consumption in such an electric device as a notebook PC is shown as the lower area in FIG. 6. Electric power is kept to be consumed there by about 0.35 W. When the AC adapter is activated, an electric power conversion loss occurs depending on the power conversion efficiency that varies among AC adapters and among PC types. The power loss by this AC adapter is, for example, shown as the upper area (raised portion) in FIG. 6. In this case, electric power is kept to be consumed there by about 1 W. In particular, in the conventional example shown in FIG. 6, a power loss of about 1.35 W is kept even when the user does not operate the electric device connected to the AC adapter.

On the other hand, Japanese Published Unexamined Patent Application No. 11-175174 discloses a technique that measures a voltage held in load power holding means at a voltage sensor circuit when an AC voltage is supplied to a stabilized source power supply circuit via switching means, thereby controlling the output of the stabilized source power supply circuit if the measured voltage exceeds a predetermined range so as to adjust the voltage to be under the predetermined value and save the power consumption. And, Japanese Published Unexamined Patent Application No. 2000-4547 discloses a technique that employs an MPU for determining whether to charge a subject backup capacitor if a switch for supplying AC electric power is powered off so as to turn on the switch and turns off the switch again if the charging of the backup capacitor is completed, thereby reducing the stand-by time power consumption endlessly up to zero.

PROBLEMS TO BE SOLVED BY THE INVENTION

However, as described with reference to FIG. 6, for a conventional electric power supply apparatus employed, for example, for a notebook PC, the power conversion loss in the ordinary AC adapter reaches about 1 W when the PC is powered off or even when it is suspended. This power loss always occurs. When compared with the system power dissipation of the internal circuits in the PC, the power conversion loss in the AC adapter becomes about three times. Such a power consumption has been a problem.

The power holding means disclosed in Japanese Published Unexamined Patent Application No. 11-175174 is supposed to be used for a capacitor. For a battery, the power holding means enables a large current to flow in the battery, causing a dangerous state to occur. In addition, if the switching means is powered off, the capacitor comes to supply the whole electric power to the PC, so that the voltage drops sharply, and the switching means is powered on again and the voltage rises sharply. Particular, because the supply voltage in the output line of the source power supply varies significantly, it causes such a problem as an operation error in the PC. Furthermore, because the source power supply off period in the capacitor is short, the power reduction effect is very small. This has been another problem.

Japanese Published Unexamined Patent Application No. 2000-4547 also supposes that the disclosed technique is employed for a capacitor and it does not solve the same problems as those of the technique disclosed in Japanese Published Unexamined Patent Application No. 11-175174. In addition, because the output voltage (AC/DC) of the source power supply varies synchronously with the on/off of the switching means, a regulator is required to avoid such the synchronous variation, so the manufacturing cost is increased significantly. Especially, for a notebook PC, such a regulator is indispensable to stabilize the voltage. Otherwise, the LCD screen might flicker and the IEEE1394 device to which the output voltage of the AC adapter is supplied directly might malfunction.

SUMMARY OF THE INVENTION

Under such circumstances, it is a purpose of the present invention to solve such technical problems and reduce the power conversion loss in the source power supply significantly by switching on/off the source power supply of the AC adapter, etc.

It is another purpose of the present invention to minimize the power consumption by turning on/off the source power supply effectively, thereby providing an environmentally conscious electric device.

In order to achieve the above purpose, the present invention enables a battery to supply electric power to the subject device when the device body is not used (power off) (or loaded lightly, for example, suspended), thereby reducing the power loss in the source power supply for an AC adapter, etc. Concretely, the electric power supply apparatus of the present invention is provided with a source power supply for supplying electric power received from external to the subject system; a battery being charged with the electric power supplied from the source power supply and enabled to supply electric power to the system by discharging the charged electric power; and an electric power supply controller for controlling the supply of the electric power to the system from the source power supply and the battery. The electric power supply controller stops the supply of the electric power to the system from the source power supply and starts the supply of the electric power to the system from the battery while the source power supply is connected to the system and the system is loaded powered off or lightly.

This electric power supply controller can stop the switching operation in the source power supply so as to reduce the power consumption when the system is powered off or loaded lightly and supplies the electric power to the battery from the source power supply so as to charge the battery when the residual capacity in the battery goes under a predetermined value due to discharging. With such the configuration, the present invention makes it possible to reduce the power conversion loss in such power supply as an AC adapter or the like, thereby the total power loss in the system can be reduced. The predetermined value mentioned here is such a predetermined residual capacity as 90%, 95%, etc. This predetermined value can be determined freely by the electric power supply apparatus. There is no possibility that causes a difference between determined predetermined values ("not more than" that includes the predetermined value and "less than" that does not include the predetermined value). This is also true for the description to be made below.

In another aspect, the electric power supply apparatus of the present invention is provided with an AC adapter connected to both of an AC power source and an electric device and enabled to supply electric power to the electric device; a battery charged with the electric power supplied from the AC adapter and enabled to supply electric power to the electric device by discharging the charged electric power; and a controller for controlling so that the battery supplies the electric power to the electric device while the AC adapter is connected to the electric device and the electric device is powered off or loaded lightly.

The controller controls so that the AC adapter stops its operation when the electric device is powered off or loaded lightly, detects the residual capacity in the battery, and activates the operation of the AC adapter if the detected residual capacity is under a predetermined value, thereby charging the battery. The controller also controls so that the AC adapter operation is stopped at the end of the battery charging.

On the other hand, the present invention also provides an electric device whose body is connected to a source power supply for supplying electric power received from external to an electric device. A battery supplies electric power by repeated charging and discharging. The electric device is provided with a battery capacity detecting circuit which detects residual capacity in the battery. A comparator determines if the detected residual battery capacity is over a predetermined value. A battery power supply circuit enables the battery to supply electric power to the electric device if residual capacity is over the predetermined value as determined by the comparator while the electric device body is powered off or loaded lightly. A source power supply stopping circuit is utilized for stopping the operation of the source power supply.

The comparator determines whether or not the battery capacity is over a predetermined value after the electric power is supplied to the battery by the battery power supply circuit. The comparator is provided with charging circuit for activating the source power supply so as to charge the battery if the capacity is under the predetermined value. The "predetermined value or over", which is a criterion used by the comparator includes "a state over" the predetermined value. This is also true for the cases to be described hereinafter.

Furthermore, the present invention also provides for a computer, which is connectable to an AC adapter and consumes certain electric power even when it is powered off. The computer is provided with an electric power path connected to a secondary battery that repeats charging and discharging so as to supply electric power to a predetermined device. A controller stops the operation of the connected AC adapter if the computer is powered off and supply electric power required for the predetermined electric power from the battery via the electric power path. The controller also detects the residual capacity in the secondary battery that is discharged so as to supply the electric power required for the certain electric power and for the controller. If the detected residual capacity is under the predetermined value, the controller activates the AC adapter to charge the secondary battery.

On the other hand, the present invention also provides for an electric power supply method which supplies electric power to an electric device when it is powered off or loaded lightly. The electric device is connected to a source power supply for supplying electric power received from external to the electric device and a battery for supplying electric power by repeating charging and discharging. The method comprises the steps of detecting the residual capacity in the battery; stopping the operation of the source power supply if the detected battery capacity is over a predetermined value and discharging the battery so as to supply the electric power to the electric device, which is powered off or loaded lightly, and detecting the residual capacity in the battery, which varies due to its discharging, and activating the source power supply if the detected value is under the predetermined value, thereby charging the battery from the source power supply.

BRIEF DESCRIPTION OF THE DRAWINGS

FIGS. 1(a) and (b) show how a power loss is detected by an electric power controlling method in the embodiment of the present invention;

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

At first, the outline of the electric power supply method in this embodiment will be described before describing the electric device, etc. in detail in this embodiment.

Figure 1:
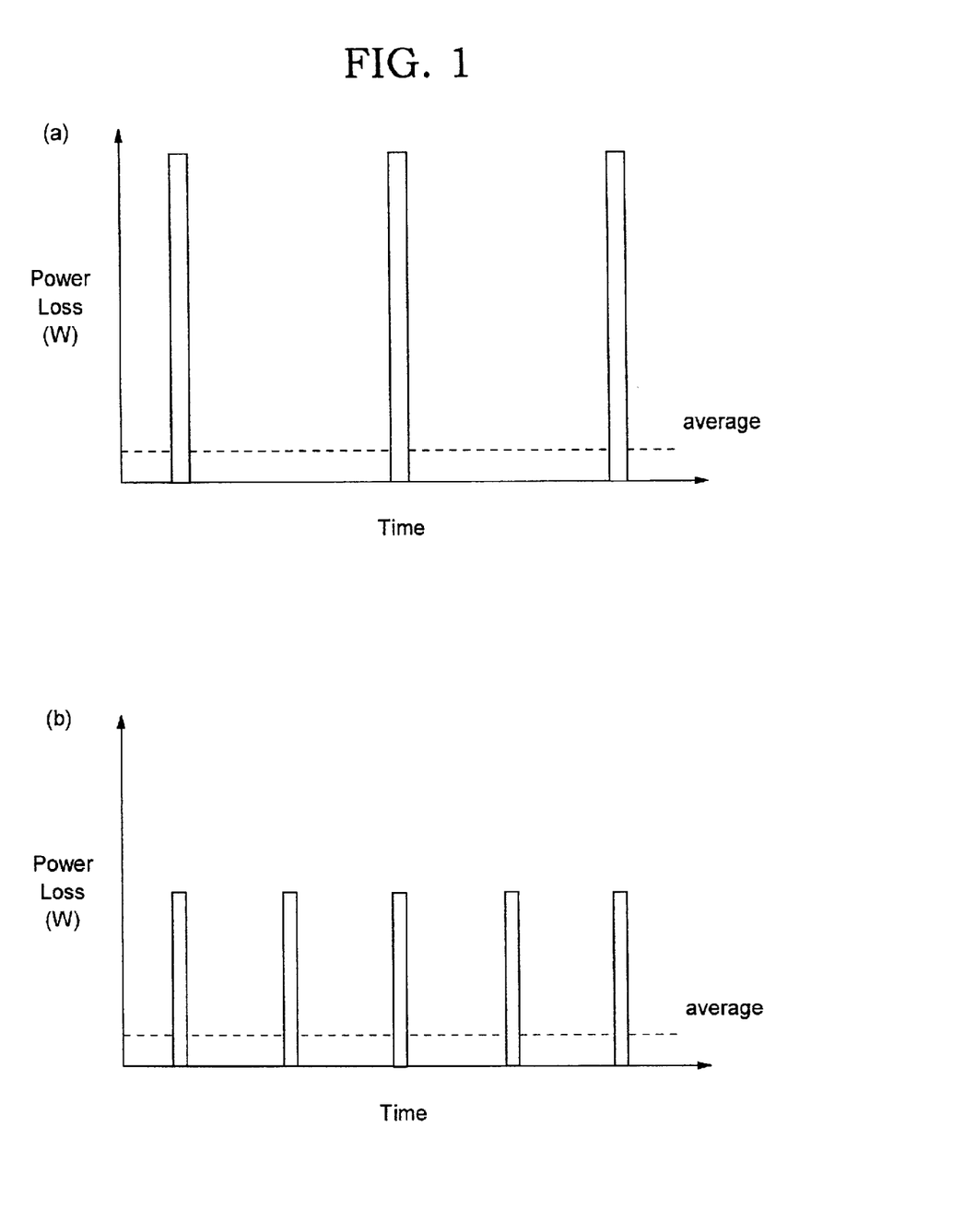

Referring now more particularly to the accompanying drawings, FIGS. 1(a) and (b) show how a power loss is reduced by the electric power controlling method in this embodiment. FIG. 1(a) shows the first case and FIG. 1(b) shows the second case. In FIGS. 1(a) and (b), an AC adapter is connected to the body of an electric device, which is powered off. The horizontal axis denotes a time and the vertical axis denotes power consumption. In this embodiment, while the electric device is not used by the user (power off), the battery supplies electric power to some of the internal circuits and the AC adapter is activated only to charge the battery.

At first, the secondary battery is charged just by a predetermined capacity (10% of the total capacity in FIG. 1(a)) periodically. After the charging, the AC adapter is powered off and the battery supplies electric power required for the device circuits. After that, when the battery capacity is reduced by a predetermined value (10% of the total capacity in FIG. 1(a)), that is, if the residual capacity reaches 90%, the AC adapter is activated again so as to charge the battery just by a predetermined value (10% of the total capacity in FIG. 1(a)). Then, the AC adapter is powered off again and the battery supplies the electric power to the circuits of the device body. By repeating the above controlling, the power conversion loss in the conventional AC adapter is prevented except during battery charging. The average power loss caused by the AC adapter can thus be reduced almost to zero.

In FIG. 1(b), the predetermined battery capacity for charging is determined to be 5% of the total capacity. After charging the battery by 5% of the total capacity, the AC adapter is powered off and the battery supplies the necessary electric power to the circuits of the electric device. After that, when the battery capacity is reduced only by 5% of the total capacity, that is, if the residual capacity reaches 95%, the AC adapter is powered on so as to charge the batter by 5% of the total capacity, which is a predetermined value. Then, the AC adapter is powered off and the battery supplies the necessary electric power to the circuits of the device body. By repeating the above controlling, the average power loss can be reduced almost to zero.

While a power-off state is shown in the example in FIG. 1(a) and (b), this embodiment can also apply to a suspend state in which a program execution, which has been active, is stopped temporarily if no input is done for a certain time, as well as other power-saving modes in which the electric device is loaded lightly. In any of such cases, electric power is kept supplied to the minimum necessary hardware items to hold data, such as the CPU, the memory, etc., so that the power consumption value shown in FIGS. 1(a) and (b) varies.

Next, other devices to which this embodiment is applied will be described in detail.

Figure 2:
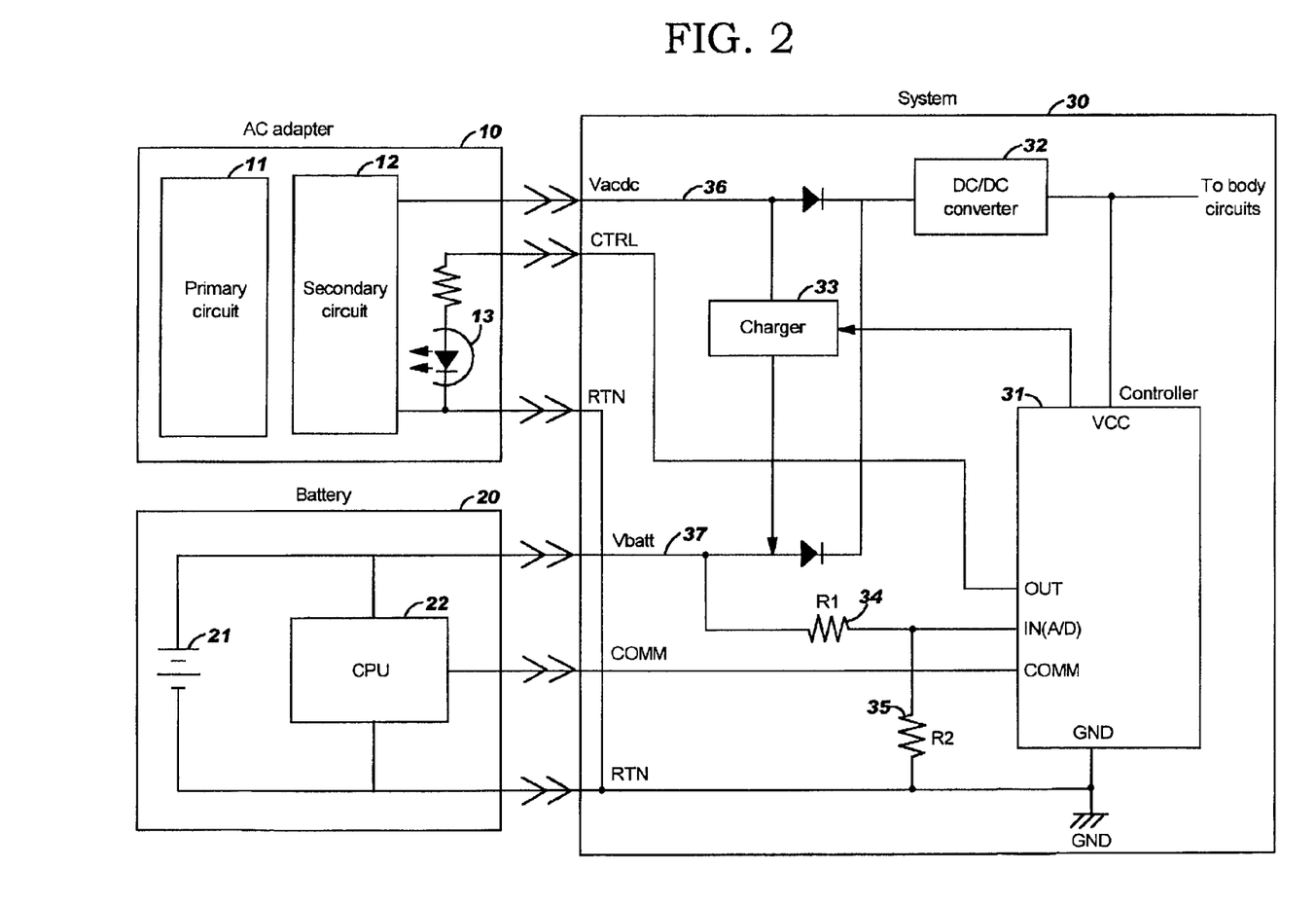
FIG. 2 is block diagram showing the total configuration of an electric power supply apparatus in the embodiment of the present invention.

FIG. 2 is a block diagram of the whole electric power supply apparatus in this embodiment. In FIG. 2, the apparatus is roughly divided into some components; concretely, an AC adapter 10, which is a source power supply connected to an AC power source and enabled to convert AC electric power to DC electric power so as to supply the converted DC electric power to a system; a battery 20, which is a secondary battery for supplying electric power by repeating charging and discharging; and a system 30 built in such an electric device as a notebook PC and enabled to supply electric power to the circuits in the body of the electric device. The AC adapter 10 supplies electric power to the circuits in the body of the electric device via a power supply path 36, which is used for the voltage Vacdc. The battery 20 supplies electric power to the circuits in the body of the electric device via a power supply path 37, which is used for the voltage Vbatt.

This AC adapter 10 is provided with a primary high voltage circuit 11 for receiving an input voltage from the AC power source; a secondary circuit 12 insulated from the primary circuit 11 and enabled to output a voltage Vacdc to the system 30; and a photo-coupler 13 for transferring signal to the primary circuit 11 in response to each command from the controller 31 of the system 30. The AC adapter 10 will be described more in detail later. The battery 20 is provided with a battery 21 configured by a lithium-ion battery, etc., and a CPU 22 enabled to obtain such data as the residual capacity of the battery 21 and communicate with the system 30. The battery 20 functions as an intelligent battery. However, the system 30 can execute the functions of the CPU 22 so that the battery 20 is configured as a non-intelligent battery.

In addition to the controller 31 for controlling the electric power supply apparatus in this embodiment, the system 30 is also provided with a DC/DC converter 32 and a battery charger 33. The DC/DC converter 32 receives, for example, 16V input voltage from the AC adapter 10 and an about 10V input voltage (Vin) from the battery 20 and supplies an about 1.6V output voltage (Vout) to the circuits in the body of the apparatus. The battery charger 33 enables the AC adapter 10 to charge the battery 20. The controller 31 detects the state of the battery 20 via the CPU 22 of the battery 20 and controls the AC adapter 10, the battery 20, and the charger 33.

Concretely, if the battery 20 is an intelligent battery (i.e., the battery incorporates CPU 22 and functions so as to obtain data related to various batteries and communicate with the system 30), the battery 20 uses the communication functions to transfer the capacity data of the battery 21 to the controller 31 of the system 30. This capacity data is sent to the controller 31 via a control line (COMM). If the battery 20 is a non-intelligent battery that is not provided with the CPU 22, the battery voltage is divided with use of resistors (R1) 34 and (R2) 35 in the system 30 and each of the divided voltages is entered to the IN terminal of the controller 31 so as to be converted from analog to digital data, so that the battery voltage can be detected. If this battery voltage can be read such way, the controller 31 can estimate the battery capacity roughly.

If the controller 31 of the system 30 outputs a low signal to the OUT terminal, the photo-coupler 13 in the AC adapter is powered off. When the photo-coupler 13 is powered off, the primary circuit 11 is switched ordinarily so as to output the voltage Vacdc to the secondary circuit 12. The outputted voltage Vacdc is then supplied to the battery 20 via the charger 33 and used for charging the battery 21 in the battery 20. If any circuit in the body of the electric device is active, this voltage Vacdc is supplied to the circuit via the DC/DC converter 32. To turn off the AC adapter 10, the controller 31 outputs a high signal to the OUT terminal. At this time, the photo-coupler 13 in the AC adapter 10 is powered on and the primary circuit 11 detects this on-state of the photo-coupler 13, thereby stopping the switching operation and the operation of each unnecessary circuit. At this time, the output voltage of the AC adapter 10 becomes 0V. The power loss of the AC adapter 10 in this state can be regarded to be 0 W substantially.

Figure 3:
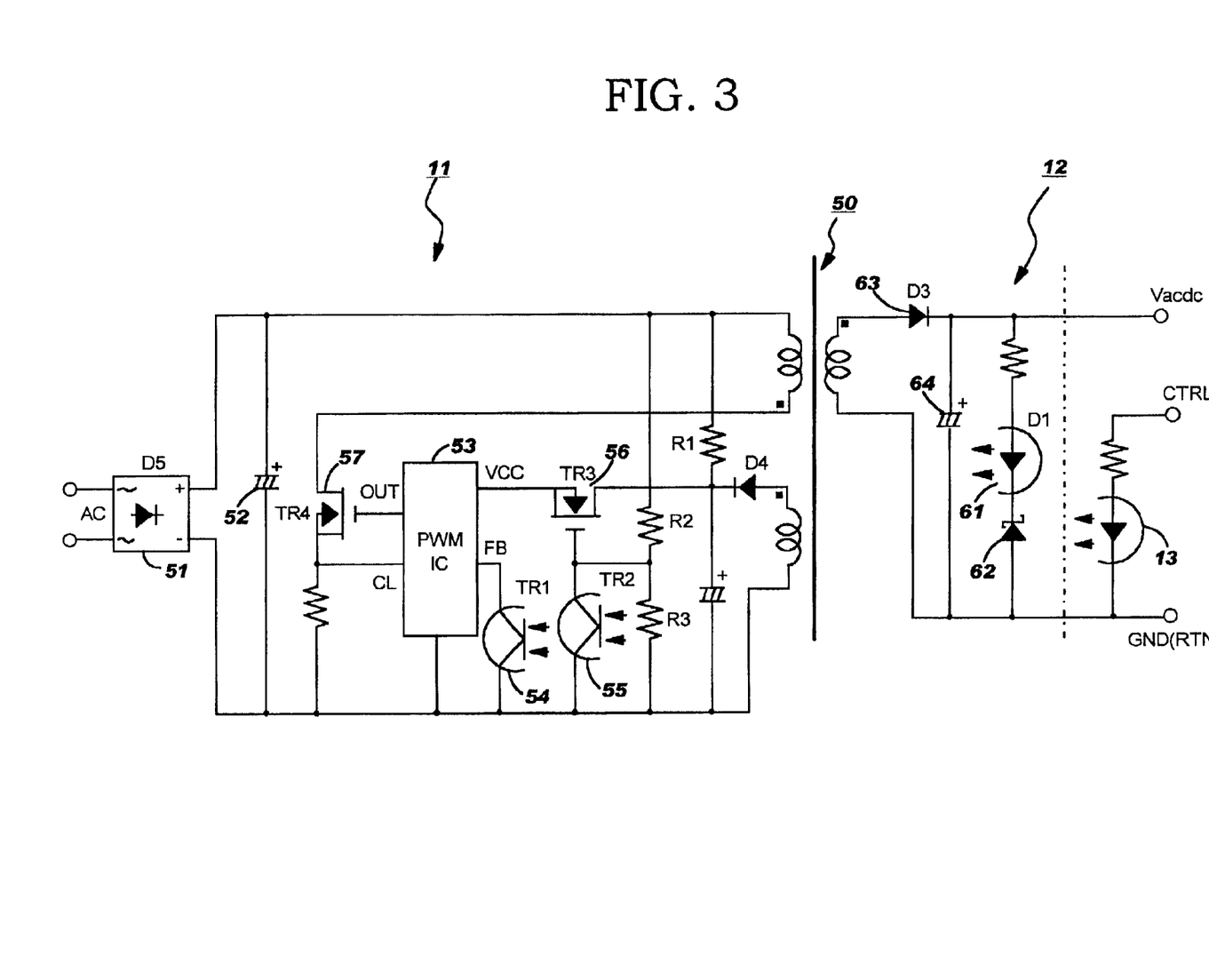
FIG. 3 is a detailed block diagram of an AC adapter 10.

FIG. 3 is a still detailed block diagram of the AC adapter 10. The primary circuit 11 is provided with a bridge diode (D5) 51 and a capacitor 52 and enabled for full-wave rectification for an input from an AC power source. The primary circuit 11 is further provided with a PWM controller (PWM IC) 53, a photo-transistor (TR1) 54, a photo-transistor (TR2) 55, a transistor (TR3) 56, a transistor (TR4) 57, as well as a plurality of resistors and diodes. On the other hand, the secondary circuit 12 configured via a transformer 50 is provided with a photo-coupler (D1) 61, a Zener diode 62, and a diode (D3) 63 and a capacitor 64. The diode (D3) 63 and the capacitor 64 are combined to rectify and smooth waves.

If the CTRL signal from the controller 31 is a high-level one, the photo-coupler 13 connected to the secondary circuit 12 is powered on and the photo-transistor (TR2) 55 of the primary circuit 11, when receiving the high-level signal, is powered on. In response to this turn-on of the photo-transistor (TR2) 55, the transistor (TR3) 56 is powered off and the supply of the voltage Vcc to the PWM controller (PWM IC) 53 is stopped. Consequently, the transistor (TR4) 57 stops its switching operation, thereby the AC adapter 10 goes into a low-power state (several tens of mW or so). When the CTRL signal goes low, the photo-transistor (TR2) 55 is powered off and the transistor (TR3) 56 is powered on. When the transistor (TR3) 56 is powered on, electric power is supplied to the PWM controller (PWM IC) 53, so the transistor (TR4) 57 can make its switching operation, so a predetermined voltage is output to the voltage Vacdc line of the secondary circuit 12.

In the above example, the switching operation is stopped and the electric power to the PWM controller (PWM IC) 53 is powered off so as to shift the AC adapter 10 into the low-power state. However, there is also another method, which provides switching between the AC power source and the AC adapter 10 (between the AC power source and the bridge diode (D5) 51). This switching circuit may be a mechanical relay circuit, a semiconductor triac, or the like. In this case, if the switching circuit is opened (powered off) while the CTRL signal goes high, the electric power in the AC adapter 10 is reduced almost to zero. In addition, when the CTRL signal is driven into the low level so as to close (turn on) the switching circuit, the AC adapter 10 can be operated so as to output the voltage Vacdc.

Next, the power source controlling method in this embodiment will be described.

Figure 4:
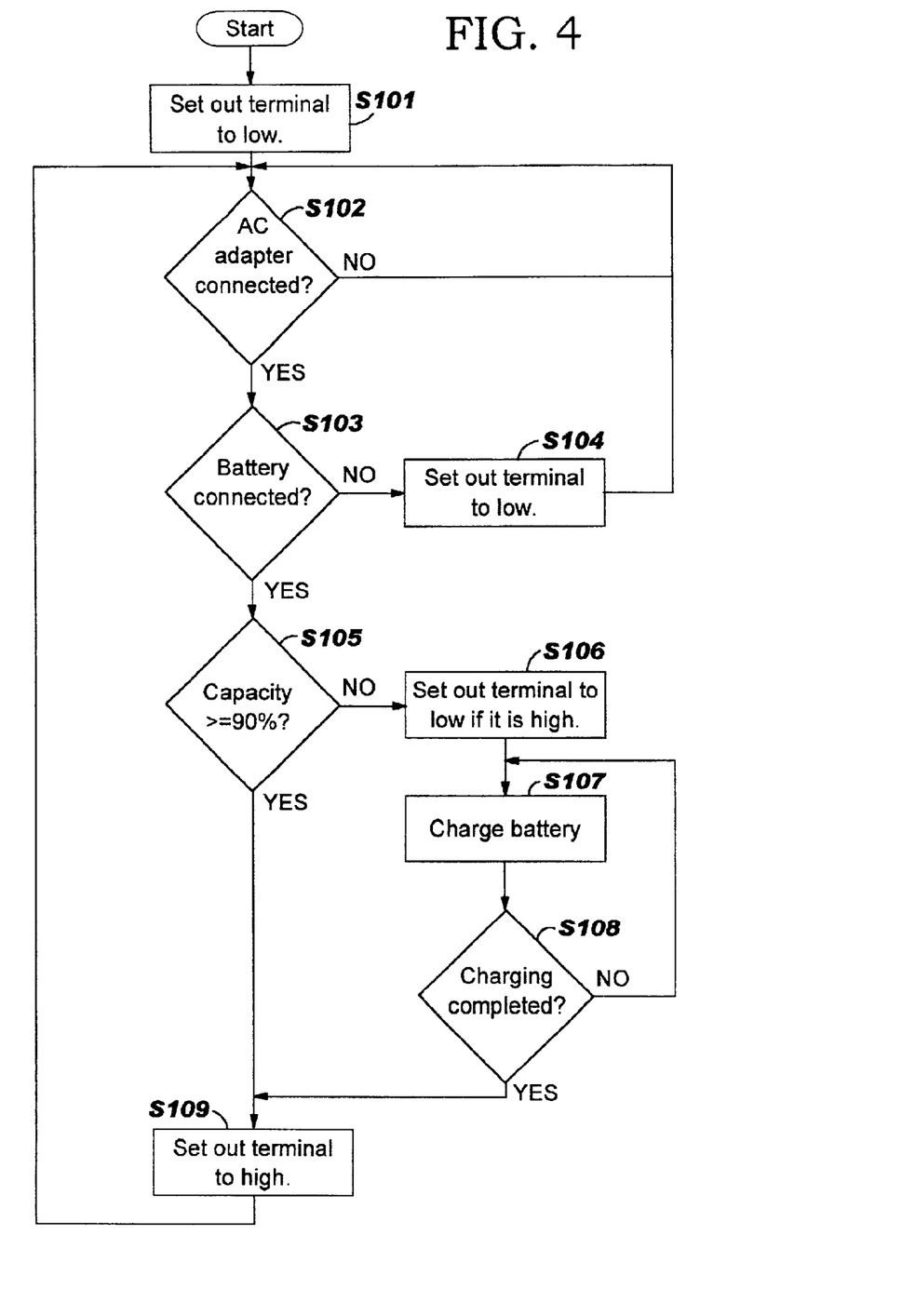
FIG. 4 is a flowchart of the steps performed with use of the electric power controlling method in the embodiment of the present invention.

FIG. 4 is a flowchart of steps performed by the power source controlling method in this embodiment. Because the circuits in the device body are kept active even after the power supply is powered off, electric power must be kept supplied to those circuits in the device body. This is why the electric power is supplied to the circuits in the device body by setting the OUT terminal of the controller 31 to low (step 101). At this time, it is detected if the AC adapter 10 is connected to the device (step 102). If the AC adapter 10 is not connected, control goes back to just before step 102 so as to supply the electric power from the battery. If the AC adapter 10 is connected, it is then detected if the battery 20 is connected to the device (step 103). If the battery 20 is not connected, a low signal is output to the OUT terminal (step 104). Control then goes back to just before step 102, in which the AC adapter 10 operates just like conventionally.

If it is determined that the battery 20 is connected in step 103, the residual capacity of the battery 20 is detected (step 105). Concretely, if the battery 20 is an intelligent one, the controller 31 communicates with the battery 20 so as to obtain capacity data as described above. If the battery 20 is a non-intelligent one, the use of the battery voltage detecting method as described above makes it easy to obtain the battery capacity, detect the current value flowing in the battery 20 in an internal circuit (not illustrated), and obtain the battery capacity by integrating those detected current values. While the battery capacity is, for example, less then 90% at this time, the OUT terminal is set to low (step 106) if it has been high (the terminal is kept low at the first flow) so as to charge the battery 21 in the battery 20 (step 107). It is no matter what the battery capacity is in the first flow.

After that, it is detected if the charging is completed or not (step 108). Concretely, it is detected if the battery capacity is 100% or not. If the charging is not completed (the battery capacity is not 100%) at this time, control goes back to step 107 so as to charge the battery 20 again. The processing is looped until the battery charging is completed. If the battery charging is completed (the battery capacity is 100%), the OUT terminal is set to high (step 109). If the battery capacity is 90% or over in step 105, the OUT terminal is set to high (step 109) in the same way. Because the OUT terminal of the controller 31 is set to high such way, the operation of the AC adapter 10 is stopped, thereby the circuits in the device body are driven by the battery. In this state, the power loss by the AC adapter 10 is suppressed to zero.

After the processing in step 109, control goes back just before step 102 and the steps in and after step 102 are repeated. The circuits in the device body are driven for a fixed time (ex., several tens of hours) and the battery capacity is reduced gradually, so that the battery capacity becomes 90% or under in step 105. This is detected by the controller 31 and the OUT terminal is set to low (step 106), so that the battery 21 in the battery 20 is charged (step 107). After that, the electric power is controlled in the same way as in the above processing flow.

Next, the effects of this embodiment will be described with use of concrete values.

At first, the battery 21 employed in the battery 20 is a lithium-ion battery having a capacity of 1.8 Ah per cell. The battery 21 is configured by 6 cells arranged serially in 2 rows×3 columns. The average voltage of the battery 21 is assumed to be 3.7V. In this case, the capacity of this battery 21 is calculated as follows.

$$1.8(Ah) \times 2(cells) \times 3.7(V) \times 3(cells) = 40(Wh)$$

Therefore, the capacity between 90% and 100% is about 4(Wh).

If the conversion efficiency of the AC adapter 10 is assumed to be 83% when the battery 21 is charged, the electric power required to charge the battery 21 to 100% of the capacity, when the residual capacity is 90%, is calculated as follows.

$$4(Wh)/0.83 = 4.82(Wh)$$

If the electric power consumed by the internal circuits is 0.35 W when the device is powered off, the time required to reduce the capacity of the battery 21 from 100% to 90% is calculated as follows.

$$4(Wh)/0.35(W) = 11.42(hours)$$

Consequently, the average electric power consumed when the device is powered off is calculated as follows.

$$4.82(Wh)/11.42(hours) = 0.42(W)$$

Because the power consumption of the internal circuits in the electric device body is 0.35 W of this average electric power, the average system power dissipation loss of the AC adapter 10 becomes 0.07 W, that is, 70 mW. When compared with the system power dissipation loss of the conventional AC adapter is 1 W, the AC adapter 10 in this embodiment can reduce the system power dissipation loss by 93%. It will thus be understood that the efficiency is improved significantly.

Figure 5:
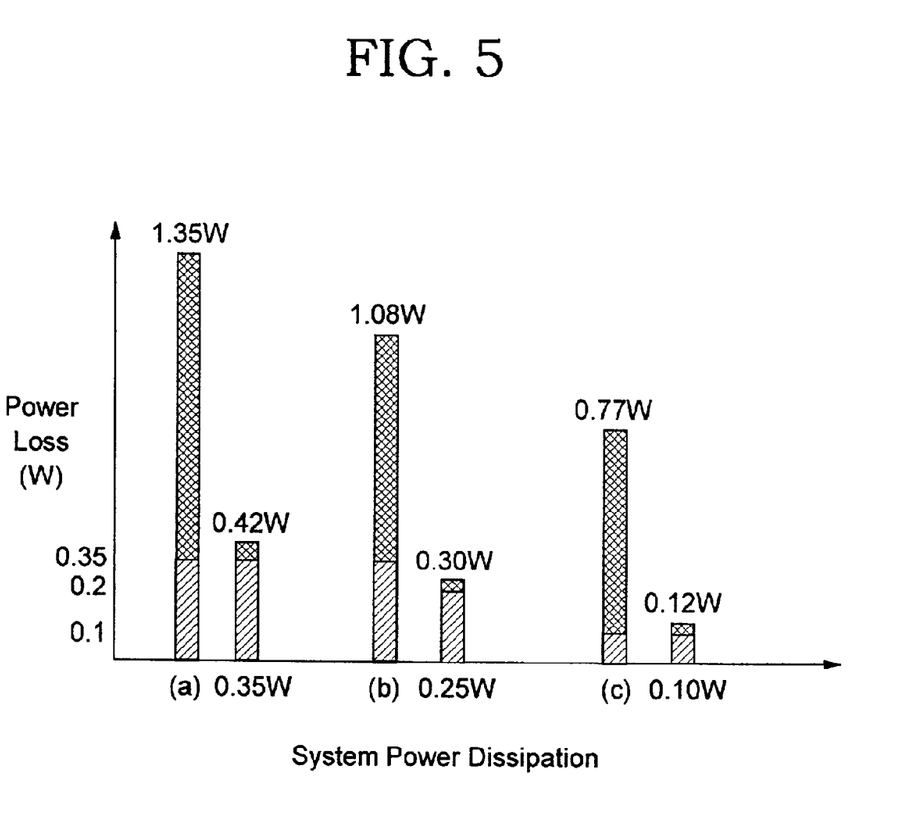
FIG. 5 is a graph showing the system power dissipation by the conventional AC adapter and the power-saving effect by the AC adapter 10 in the embodiment of the present invention.

FIG. 5 is a graph of a comparison between power-saving effects of the conventional AC adapter and the AC adapter in this embodiment. For this graph, three notebook PC machines (a) to (c) are picked up and the system power dissipation in each of those PC machines is shown on the vertical axis.

FIG. 5(a) shows a case in which the system power dissipation in the internal circuits of the machine is 0.35 W. FIG. 5(b) shows a case in which the system power dissipation in the internal circuits of the machine is 0.25 W. FIG. 5(c) shows a case in which the system power dissipation in the internal circuits of the machine is 0.1 W. The power loss by the AC power source can be reduced from 1 W to 0.07 W (70 mW) in (a) and from 0.83 W to 0.05 W (50 mW) in (b) and from 0.67 W to 0.02 W (20 mW) in (c) respectively.

As understood clearly in the comparison on the basis of actual values, this embodiment can suppress the power loss significantly when the switching of the AC adapter 10 is stopped, thereby the output voltage is powered off.

If the AC adapter 10 is connected to the electric device, the system power dissipation when the device is powered off is almost identical to the system power dissipation when the device is suspended. Consequently, the electric power apparatus in which this embodiment is optimized can improve the "energy consumption efficiency", which is an energy saving method, significantly.

Sometimes, however, the user of the electric device that employs this embodiment might feel why the capacity of the battery 21 is reduced while the AC adapter 10 is connected to the electric device. In such a case, it is possible to configure the display method so that only 10% of the actual capacity of the battery 21 is used for the purpose of this embodiment and the residual real capacity 90% is displayed for the user as the total capacity data 100%. With such the display method, the user will not have a feeling of such the wrongness from the displayed apparent residual capacity of the battery 21. There is also another display method; the charging progress display is stopped while the battery 21 is charged in this embodiment. According to those display methods, the user will not recognize any of discharging from the battery 21 and the re-charging of the battery 21 while the AC adapter 10 is connected to the electric device in this embodiment.

Furthermore, in this embodiment, the battery 21 keeps discharging and it is re-charged when the capacity is reduced to, for example, 90% even while the AC adapter 10 is connected to the electric device. This is why influences to be exerted on the cycle life of the battery 21 must be taken into consideration. In the example shown in FIG. 5(a) is the worst case in which the system power dissipation is 0.35 W. In this case, the residual battery capacity is reduced from 100% to 90% in about 11.4 hours. Consequently, charging and discharging are repeated by about 770 times in maximum for one year. At present, for the lithium-ion battery, which is the main stream of batteries used for notebook PCs, charging and discharging in this embodiment becomes about 30 times when they are converted to the 100% capacity charging/discharging. The influence of this embodiment to be exerted on the cycle life of charging and discharging is small when the charging/discharging cycle life of the lithium-ion battery (the number of charging/discharging cycles required to reach 60% of the initial total capacity of the battery) is 500 times or over. Employment of this embodiment will therefore arise no problem from such the cycle life of charging and discharging. While the preferred embodiment of the invention has been described for such an electric device as a notebook PC, the present invention can also apply to a car provided with, for example, a built-in rechargeable battery, etc.

I claim:

1. An electronic power supply apparatus, comprising:
   a source power supply which supplies to a system electric power received from an external power source;
   a battery which is charged with electric power supplied from said source power supply and which discharges electric power to said system; and
   an electric power supply controller coupled to said source power supply and to said battery and which controls supply of electric power to said system from said source power supply and said battery;
   said electric power supply controller switching supply of electric power between said source power supply and said battery to said system based upon:
   a) connection status of said source power supply, and
   b) connection status of said battery, and
   c) a system parameter indicative of the status of said system.

2. The electric power supply apparatus according to claim 1;
   wherein said system parameter is indicative the load drawn by said system and wherein said electric power supply controller instructs said source power supply to stop its operation, thereby reducing the power consumption of said system when said system is loaded below a predetermined threshold.

3. The electric power supply apparatus according to claim 1;
   wherein said system parameter is indicative of the capacity of said battery and wherein said electric power supply controller instructs said source power supply to supply electric power to said battery so as to charge it when the residual capacity in said battery goes under a predetermined value due to discharging.

4. An electric power supply apparatus, comprising:
an AC adapter connected to an AC power source and enabled to supply electric power to an electric device connected thereto;
a battery which is charged with electric power supplied from said AC adapter and is enabled to discharge electric power to said electric device; and
a controller which controls the supply of electric power so that, in response to a determination that said battery is connected to said electric device, said battery supplies electric power to said electric device while said electric device connected to said AC adapter is loaded below a predetermined value, and so that in response to a determination that said battery is not connected, said AC adapter continues to supply power to said electric device.

5. The electric power supply apparatus according to claim 4;
wherein said controller controls so as to stop the operation of said AC adapter while said electric device is loaded below a predetermined value.

6. The electric power supply apparatus according to claim 5;
wherein said controller detects the residual capacity in said battery and activates said AC adapter to start charging of said battery if said detected residual capacity is under a predetermined value.

7. The electric power supply apparatus according to claim 6;
wherein said controller stops the operation of said AC adapter at the end of charging of said battery.

8. An electric device connectable to a source power supply for supplying electric power received from an external power source thereto and a battery that supplies electric power thereto by repeatedly charging and discharging, comprising:
a battery capacity detector which detects the residual battery capacity in said battery;
a comparator which determines said battery capacity is over a predetermined value as detected by said battery capacity detector;
a battery power supply which supplies electric power to said device from said battery if said battery capacity is over said predetermined value as determined by said comparator while load from said electric device is below a predetermined value; and
a source power supply controller which, in response to a determination that said battery is connected to said electric device, stops the operation of said source power supply and which, in response to a determination that said battery is not connected, maintains the operation of said source power supply.

9. The electric device according to claim 8;
wherein said electric device is a car.

10. The electric device according to claim 8;
wherein said electric device is a computer.

11. The electric device according to claim 8;
wherein said comparator determines said residual battery capacity is over said predetermined value after said battery power supply supplies electric power to said battery; and said electric device further includes a charger which operates said source power supply so as to charge said battery if the residual capacity in said battery is under said predetermined value as determined by said comparator.

12. A computer connectable to an AC adapter and consuming predetermined electric power even when it is powered off, said computer comprising:
a power supply path connected to a secondary battery that repeatedly charges and discharges and supplies electric power to said computer; and
a controller which conditionally stops the operation of said AC adapter connected thereto after said computer is powered off based on the connection status of the said battery and enables said battery to supply electric power required for said predetermined electric power via said power supply path in response to a determination that said battery is connected to said computer and maintains the operation of said AC adapter in response to a determination that said battery is not connected to said computer.

13. The computer according to claim 12;
wherein said controller detects the residual capacity of said secondary battery, which is reduced due to discharging and charges said secondary battery by activating said AC adapter if said detected residual capacity is under a predetermined value.

14. An electric power supply method employed for an electric device when said electric device is powered off or loaded lightly, said electric device being connected to a source power supply for supplying electric power received from an external power source and a battery for supplying electric power by repeated charging and discharging, said method comprising:
detecting the residual capacity in said battery;
determining whether said battery is connected to said electric device;
in response to a determination that said battery is connected to said electric device,
stopping the operation of said source power supply if said detected residual capacity in said battery is over a predetermined value, and
enabling said battery to discharge electricity so as to supply electric power to said electric device when said electric device is loaded below a predetermined value; and
in response to a determination that said battery is not connected to said electric device, maintaining the operation of said source power supply.

15. The electric power supply method according to claim 14;
wherein said method further includes the steps of:
in further response to said determination that said battery, is connected to said electric device,
detecting the residual capacity in said battery, which is changed due to its discharging;
activating said source power supply if said detected residual capacity in said battery is under said predetermined value; and
enabling said source power supply to charge said battery.

* * * * *